US011461507B2

(12) United States Patent
Rexilius

(10) Patent No.: US 11,461,507 B2
(45) Date of Patent: Oct. 4, 2022

(54) SYSTEMS AND METHODS FOR SECURE PERIPHERALS

(71) Applicant: Third Block Gear LLC, Austin, TX (US)

(72) Inventor: Jason Allen Rexilius, Austin, TX (US)

(73) Assignee: Third Block Gear, Austin, TX (US)

( * ) Notice: Subject to any disclaimer, the term of this patent is extended or adjusted under 35 U.S.C. 154(b) by 72 days.

(21) Appl. No.: 16/668,659

(22) Filed: Oct. 30, 2019

(65) Prior Publication Data

US 2020/0134237 A1 Apr. 30, 2020

Related U.S. Application Data

(60) Provisional application No. 62/752,393, filed on Oct. 30, 2018.

(51) Int. Cl.
| | |
|---|---|
| *G06F 21/79* | (2013.01) |
| *G06F 21/36* | (2013.01) |
| *G06F 21/60* | (2013.01) |
| *G06F 21/71* | (2013.01) |
| *G06F 21/83* | (2013.01) |
| *H04L 9/06* | (2006.01) |

(52) U.S. Cl.
CPC ............. *G06F 21/79* (2013.01); *G06F 21/36* (2013.01); *G06F 21/602* (2013.01); *G06F 21/71* (2013.01); *G06F 21/83* (2013.01); *H04L 9/0618* (2013.01)

(58) Field of Classification Search
CPC ........ G06F 21/36; G06F 21/602; G06F 21/71; G06F 21/74; G06F 21/79; G06F 21/83; G06F 21/84; H04L 9/0618
See application file for complete search history.

(56) References Cited

U.S. PATENT DOCUMENTS

| 10,318,744 B2 * | 6/2019 | Dow ..................... G06F 21/602 |
| 2009/0300368 A1 * | 12/2009 | Zilberstein .............. G06F 21/83 |
| | | 713/190 |
| 2018/0026947 A1 * | 1/2018 | Haworth ................. H04L 63/06 |
| | | 713/168 |
| 2018/0150630 A1 * | 5/2018 | Pike ....................... G07F 7/1075 |
| 2019/0354153 A1 * | 11/2019 | Hauser ....................... G06F 1/28 |
| 2020/0125772 A1 * | 4/2020 | Volos ......................... H04L 9/30 |

FOREIGN PATENT DOCUMENTS

CN 102193736 A * 9/2011

* cited by examiner

*Primary Examiner* — Carl G Colin
*Assistant Examiner* — Hany S. Gadalla

(57) ABSTRACT

Systems and methods for an interface device that is configured to locally generated encrypted data and also receive encrypted data from a host computer, locally decrypt the data, and present the decrypted data independently from the host computer.

10 Claims, 5 Drawing Sheets

SYSTEMS AND METHODS FOR SECURE PERIPHERALS

CROSS-REFERENCE TO RELATED APPLICATIONS

This application claims a benefit of priority under 35 U.S.C. § 119 to Provisional Application No. 62/752,393 filed on Oct. 30, 2018, which is fully incorporated herein by reference in their entirety.

BACKGROUND INFORMATION

Field of the Disclosure

Examples of the present disclosure are related to systems and methods for encrypted computing peripherals. More particularly, embodiments disclose a user interface device that is configured to locally encrypt and decrypt data before and after that data is communicated through a host.

Background

In cryptography, encryption is the process of encoding data in such a way that only authorized parties can access it. When encrypting data, plaintext is encrypted using an encryption algorithm that can only be read properly if decrypted.

In conventional systems, a first host utilizes a peripheral user interface, such as a keyboard, to generate plaintext. The first host then locally encrypts the plaintext, and communicates the encrypted plaintext to a second host. Next, the second host locally decrypts the encrypted plaintext. The plaintext may be presented on a second peripheral device, such as a display or monitor, associated with the second host.

However, this conventional cryptography scheme is inherently insecure due to supply chain systems required to manufacture the hosts, and the complexity of the firmware and software necessary to operate the hosts and the peripheral devices. This requires non-encrypted data to be transferred between the hosts and the peripheral devices. However, third party hardware, firmware, and software located at the hosts and the peripheral devices cannot be reliably audited and secured.

Accordingly, needs exist for more effective and efficient systems and methods for interface devices that are configured to locally encrypt and decrypt data at a location that is independent from a host system.

SUMMARY

Embodiments disclosed herein describe systems and methods for peripheral user interface devices that are configured to encrypt, decrypt, and display data at a location independent from a host computer. This allows for limiting the transfer of unencrypted data across multiple platforms.

In embodiments, the peripheral user interface devices (referred to hereinafter as "interface devices") may be configured to directly receive inputs from a user, and encrypt the data before the data is transmitted to a host computer or any other computing device. The interface device may also receive encrypted data from a host computer, locally decrypt the data, and locally present the data. In embodiments, the interface device may be configured to only transmit data to the host, and not receive any data from the host. In embodiments, the interface may include a communication port, input device, cryptology module, camera, and display.

The communication port may be configured to communicatively couple the interface device to a host computer. The communication port may operate over a wired connection, such as a USB port, or operate wirelessly, such as using a Bluetooth protocol.

The input device may be a keyboard, touchscreen, controller, etc. that is configured the receive inputs from a user. The input device may utilize a series of buttons, keys, joysticks, cameras, microphones, etc. that are used to translate inputs into electronic data.

In a first mode of operation, the interface device may operate as a standard peripheral, wherein the electronic data may be transmitted to a host computing device via the communication port. The host computing device may translate the electronic data and/or encrypt the data. In a second mode of operation, the electronic data may be locally encrypted at the input device that receives the user's commands. The electronic data may be locally encrypted at the interface device before the encrypted data is transmitted to the host computing device, as such the host device may receive decrypted data directly from the interface device. This may secure the data more effectively, while also limiting the amount of computing resources that the host device would need to decrypt the data.

The cryptology module may be configured to locally encrypt data generated at the input device or decrypt data received by the input device over the communication port. The cryptology module may be configured to encrypt the electronic data as plaintext, which can be embedded in a text stream using a default language dictionary. The text stream may be communicated to the host computing device via the communication port at a measured rate. In embodiments, the cryptology module may be configured to encrypt the electronic data in any known encryption technique, such as via key pairs, hashes, etc.

The camera may be a device that is locally embedded within the user interface, and is configured to record still images, videos, etc. In embodiments, the camera may be configured to electronic data by scanning bar codes, QR codes, or any other machine-readable optical label that includes information. The electronic data may then be encrypted utilizing the cryptology module.

The display may be a device that is locally embedded within the user interface, and is configured to present decrypted data to a user. Furthermore, the display may be configured to display encrypted data on the user interface that generated the encrypted data. The display may also be able to present machine readable optical labels that are encrypted by the cryptology module.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the fol

Figure 1:
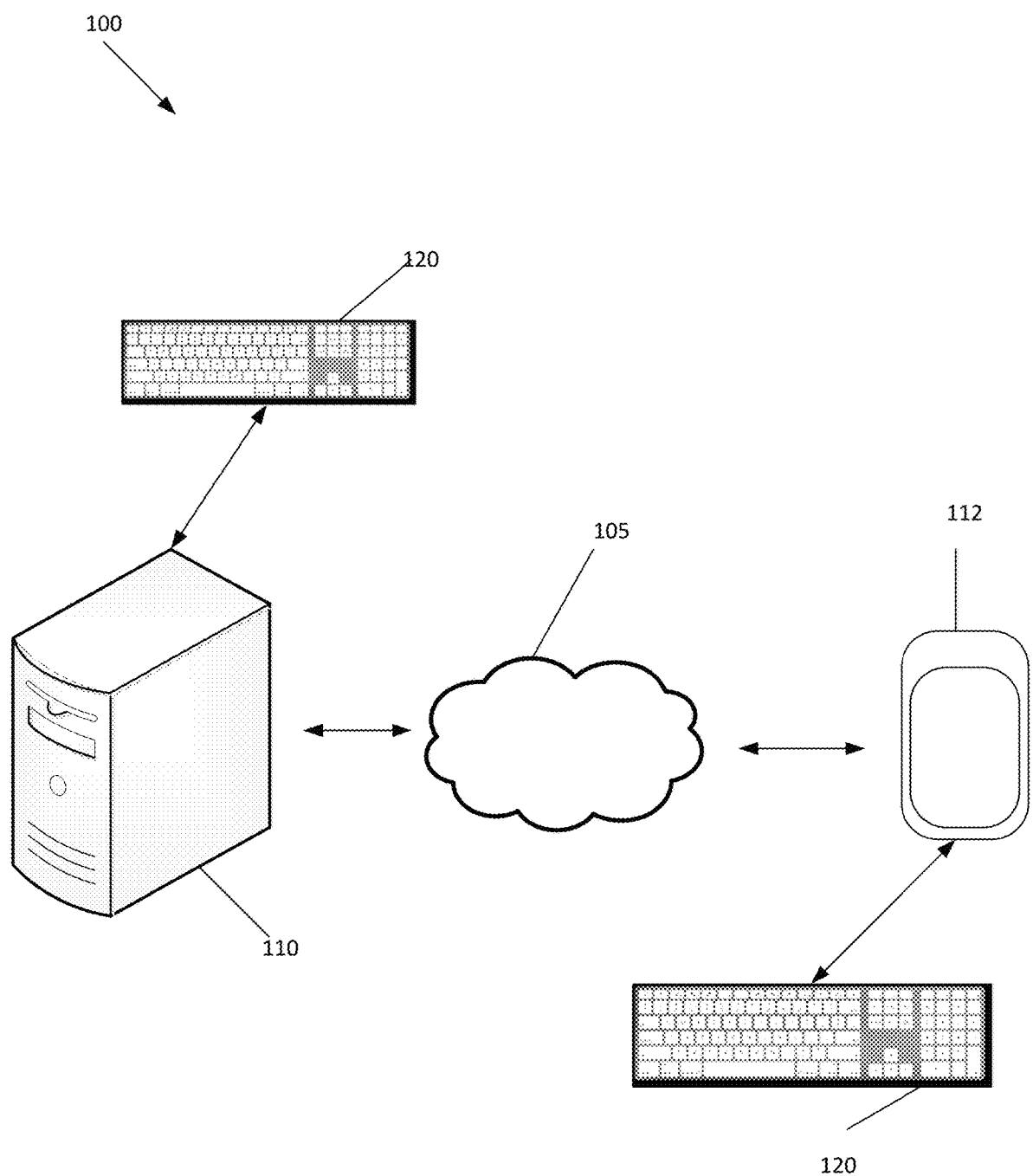
- FIG. 1 depicts a topology for a cryptology system, according to an embodiment

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

FIG. 1 depicts one embodiment of a topology for cryptology system 100. Cryptology system 100 may include a network 105, first host 110, second host 112, and at least one interface device 120.

Network 105 may be a wired or wireless network such as the Internet, an intranet, a LAN, a WAN, a NFC network, Bluetooth, universal serial bus, infrared, radio frequency, a cellular network, or another type of network. It will be understood that network 105 may be a combination of multiple different kinds of wired or wireless networks. Network 105 may be communicatively coupled to a plurality of hosts 110, 112, and allow data to be communicated over different protocols to the hosts 110, 112.

First host 110 and second host 112 may be laptop computers, desktop computers, smart phones, tablet computers, personal data assistants, head-mounted computing devices, arm-mounted computing devices or any other type of devices with a hardware processor that is configured to process instructions and connect to network 105. First host 110 and second host 112 may include a display configured to present data received and/or generated by first host 110 or second host 112. Hosts 110, 112 may be configured to perform hardware initialization during a booting process, provide runtime services for an operating system, the operating system itself, implement software programs, and provide runtime services for peripheral devices, such as interface device 120.

Interface device 120 may be a peripheral device that is configured to be communicatively coupled to a host 110, 112. Interface device 120 may be an auxiliary device that is intended to be connected to a host 110, 112 and used in connection with host 110, 112. Interface device 120 may not have access to or be part of the essential computing resources associated with host 110, 112. As such, interface device 120 may not have access to utilize the computing resources, such as a micro-process, operating device, software, memory, etc. that can be utilized by host 110, 112. In embodiments, the interface device 120 may not be able to run independently from host 110, 112 and may require a separate host 110, 112 to operate. Interface device 120 may be an ancillary device used to input and output data to and from host 110, 112. Interface device 110 may be configured to be communicatively coupled to host 110 over a wired connection, such as through a USB port, or over a wireless connection, such as through a Bluetooth protocol. In embodiments, interface device 120 may not be able to communicate directly over network 105. Interface device 120 may include an input device that is configured to receive inputs from a user, a camera configured to record and a hardware processor configured to translate the received inputs to electronic data, a cryptology module configured to encrypt the electronic data and decrypt received encrypted data, the display may be configured to present encrypted and decrypted data to a user. In embodiments, interface device 120 may be configured to transmit encrypted messages as printable text, such that it can be used as normal input to any existing applications or services.

Figure 2:
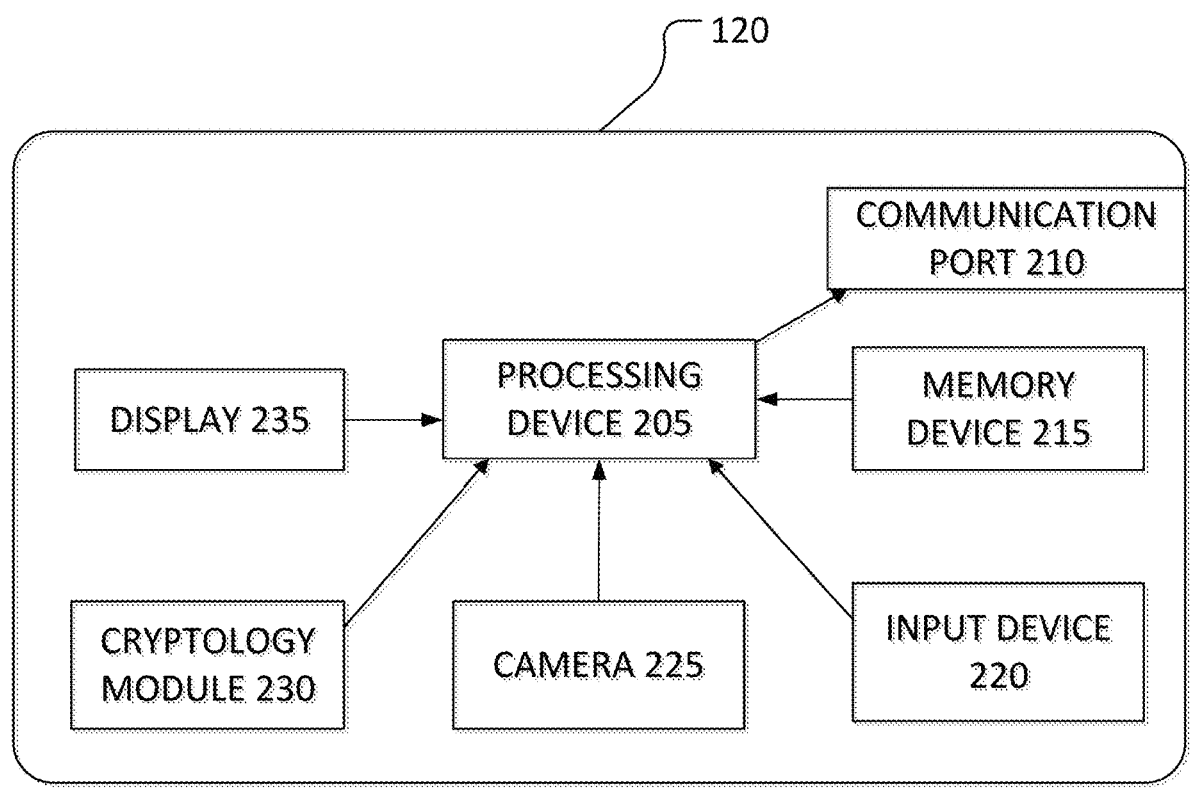
FIG. 2 depicts an interface device, according to an embodiment.

FIG. 2 depicts one embodiment of interface device 120. Interface device 110 may include a processing device 205, a communication port 210, a memory device 215, input device 220, camera 225, cryptology module 230, and display 235.

Processing device 205 may include memory, e.g., read only memory (ROM) and random access memory (RAM), storing processor-executable instructions and one or more processors that execute the processor-executable instructions. Processing device 205 may be configured to translate received inputs from a user on input device 220 and/or camera 225 into electronic data. In embodiments, the processing device may be configured to store a private key, while a public key is output to the host device.

Communication port 210 may be a device that allows interface device 120 to communicate with another device (e.g. host 110). Communication device 210 may include one or more wireless transceivers for performing wireless communication and/or one or more communication ports for performing wired communication. Communication device 210 may be configured to communicate data over a plurality of different standards and/or protocols. In embodiments, communication device 210 may be configured to communicate data to hosts over a different communication protocol than the hosts communicate over network 105.

Memory device 215 may be a device that stores data generated or received by interface device 120. Memory device 215 may include, but is not limited to a hard disc drive, an optical disc drive, and/or a flash memory drive. In embodiments, memory device 215 may be configured to temporarily store electronic data, encrypted data, decrypted data, etc. In embodiments, responsive to the communication port 210 being disconnected from the host computer, memory device 215 may erase data stored on memory device 215. In other embodiments, memory device 215 may erase data stored on memory device 215 responsive to communication port 210 being connected to the host computer. In further embodiments, responsive to interface device 120 changing between a first and second mode, memory device 215 may erase data stored on memory device 215.

Input device 220 may be a keyboard, touchscreen, microphone, camera, controller, etc. that is configured to receive inputs from the user. Input device 220 may utilize a series of buttons, keys, joysticks, etc. that are configured to receive inputs from a user such that processing device 205 can translate the received inputs into electronic data. Input device 220 may have a first mode of operation and a second mode of operation. In a first mode of operation, input device 220 may be configured to transmit non-encrypted electronic data from interface device 120 to host 110. In a second mode of operation, input device 220 may be configured to transmit locally encrypted data to host 110, wherein the electronic data is encrypted before being communicated to host 110.

Camera 225 may be a device that is embedded within the user interface, and is configured to record still images, videos, etc. In embodiments, Camera 225 may be configured to generate electronic data by scanning bar codes, QR codes, or any other machine-readable optical label that includes information. The electronic data may then be encrypted utilizing the cryptology module 230

Cryptology module 230 may be a hardware processing device that configured to locally encrypt and/or decrypt data generated and/or received by interface device 120 when operating in the second mode. Cryptology module 230 may be configured to encrypt the electronic data generated by input device 220 as plaintext, which can be embedded in a text stream using a default language dictionary. The text stream may be communicated to the host computing device via the communication port at a measured rate. In embodiments, cryptology module 230 may be configured to encrypt the electronic data using any known encryption technique, such as via key pairs, hashes, etc. the data may be encrypted directly after receiving the electronic data before the data is transmitted to a host. Cryptology module 230 may also be configured to decrypt received encrypted data. Responsive to locally decrypting the received encrypted data, the data may be presented on display 235.

Display 235 may be a device that is embedded within interface device 120. Display 235 may be configured to present data to a user of interface device 120, including encrypted data and decrypted data. Display 235 may be configured to display encrypted data on the interface device 120 that generated the encrypted data, and decrypted data responsive to cryptology module 230 decrypting the data. Additionally, the display 235 device may be configured to present machine readable optical labels that are encrypted or decrypted by cryptology module. For example, responsive to cryptology module 230 encrypting data, display 235 may present a QR code corresponding to the encrypted data.

Figure 3:
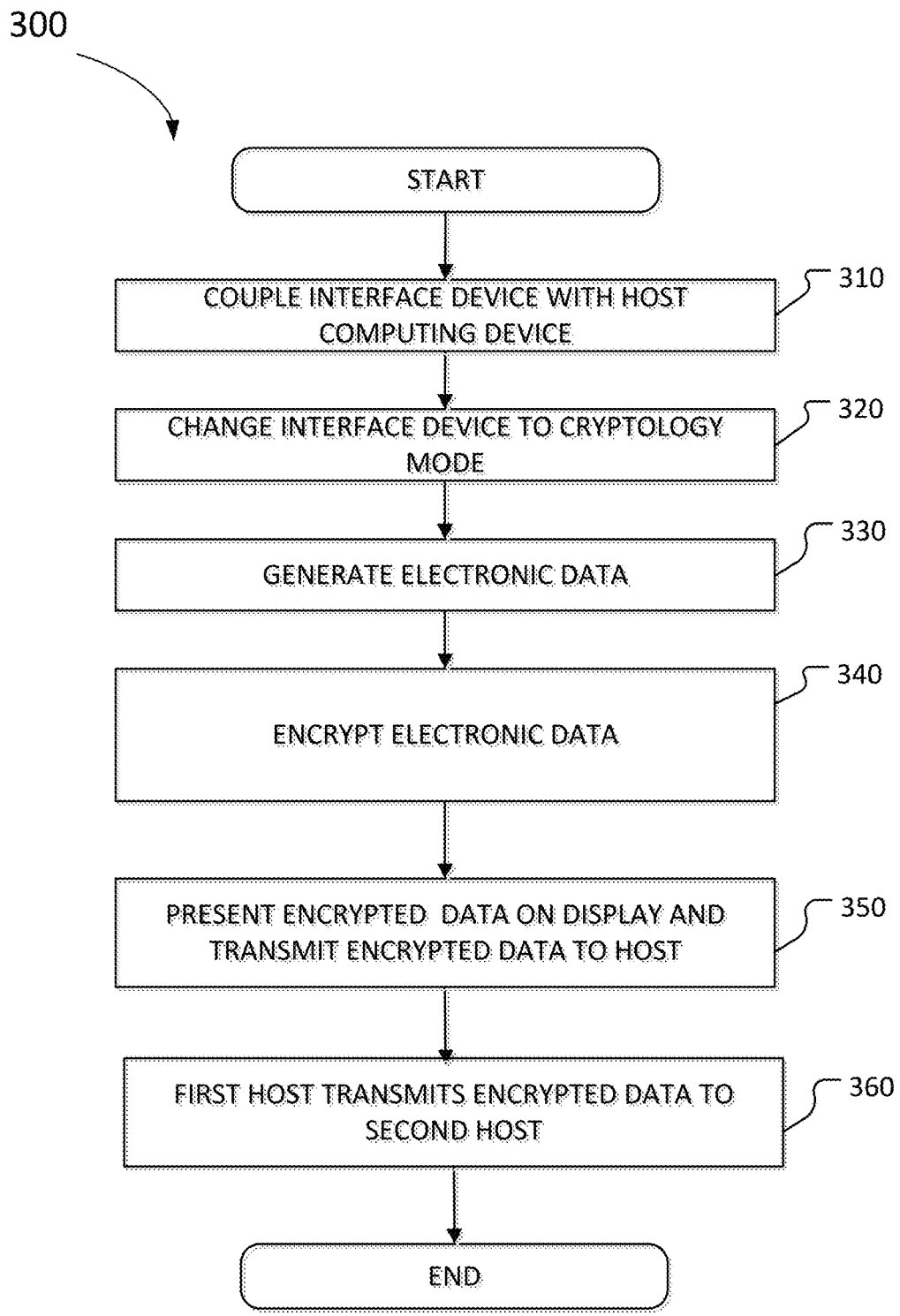
FIG. 3 depicts a method for an interface device to encrypt data, according to an embodiment.

FIG. 3 illustrates a method 300 for an interface device to encrypt data, according to an embodiment. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 310, an interface device may be communicatively coupled to a host computing device. The interface device may be coupled to the host device over a wired or a wireless connection. Responsive to coupling the interface device with the host device, a local memory on the interface device may be automatically erased. In embodiments, this may limit the amount of data locally stored on the interface device that can be accessible by a host. This clearing of the memory may automatically occur independently from what mode the interface device is operating in.

At operation 320, the interface device may be changed from operating in a standard mode to a cryptology mode. The interface device may change modes based on a user performing actions on the interface device to change the modes, such as pressing a button, moving a switch, etc. Responsive to changing the interface device to cryptology mode, a local memory on the interface device may be erased a second time. In implementations, if the interface device is operating in a standard mode, the interface device may operate as a conventional user interface.

At operation 330, a user may perform actions to interact with keys, button, etc. on an input device, wherein the performed actions correspond with generated electronic data. For example, the user may perform actions on a keyboard to generate electronic data that corresponds to an alphanumeric string of data.

At operation 340, the generated electronic data may be encrypted by a cryptology module. As such, the electronic data may be encrypted before a first host receives the data, at a location that generated the electronic data. This may limit a number of electronic devices, firmware, software, etc. that is able to access the raw electronic data.

At operation 350, the encrypted data may be presented on a display that is embedded within the interface device, and transmitted in an embedded text stream using a default language dictionary to a first host. The encrypted data transmitted to the host may appear to the first host as standard electronic data. Thus, the stream of text including the encrypted data may be used any application that takes text input, such as email, SMS, web posts, social media apps, etc. Responsive to the interface device transmitting the encrypted data to the host device, a local memory on the interface device may be erased.

At operation 360, the first host may transmit the encrypted data over a network to a second host.

Figure 4:
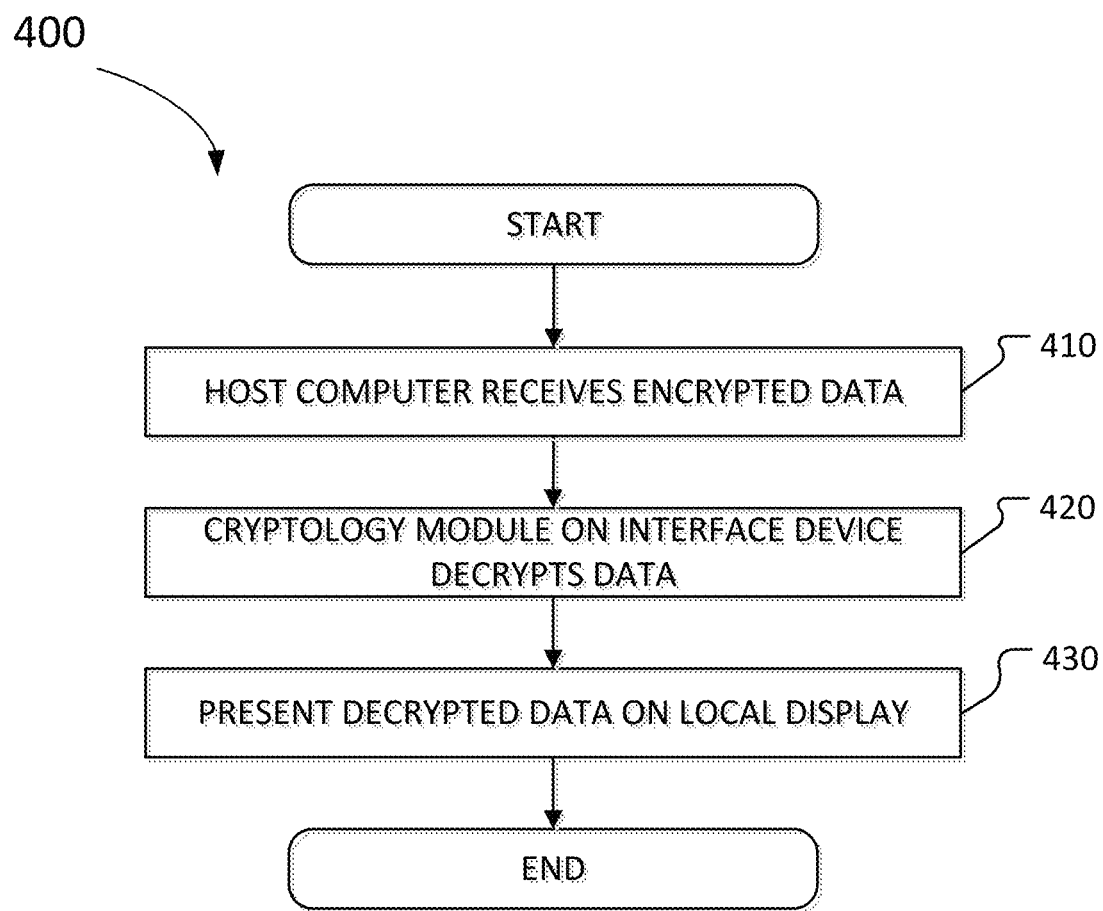
FIG. 4 depicts a method for an interface device to decrypt data, according to an embodiment.

FIG. 4 illustrates a method 400 for an interface device to decrypt data, according to an embodiment. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/ or software to be specifically designed for execution of one or more of the operations of method 400.

At operation 410, a host computing device may receive encrypted data over a network, and forward the encrypted data to an interface device.

At operation 420, responsive to receiving the encrypted data, a cryptology module locally stored on the interface device may decrypt the received data. As such, the data may be decrypted at a location that is remote from the host computing device.

At operation 430, the decrypted data may be presented on a display device that is local to the interface device. Therefore, the decrypted data may not be presented on any device that is remote from the interface device. Responsive to the interface device presenting the decrypted data on the local display, a local memory on the interface device may be erased.

Figure 5:
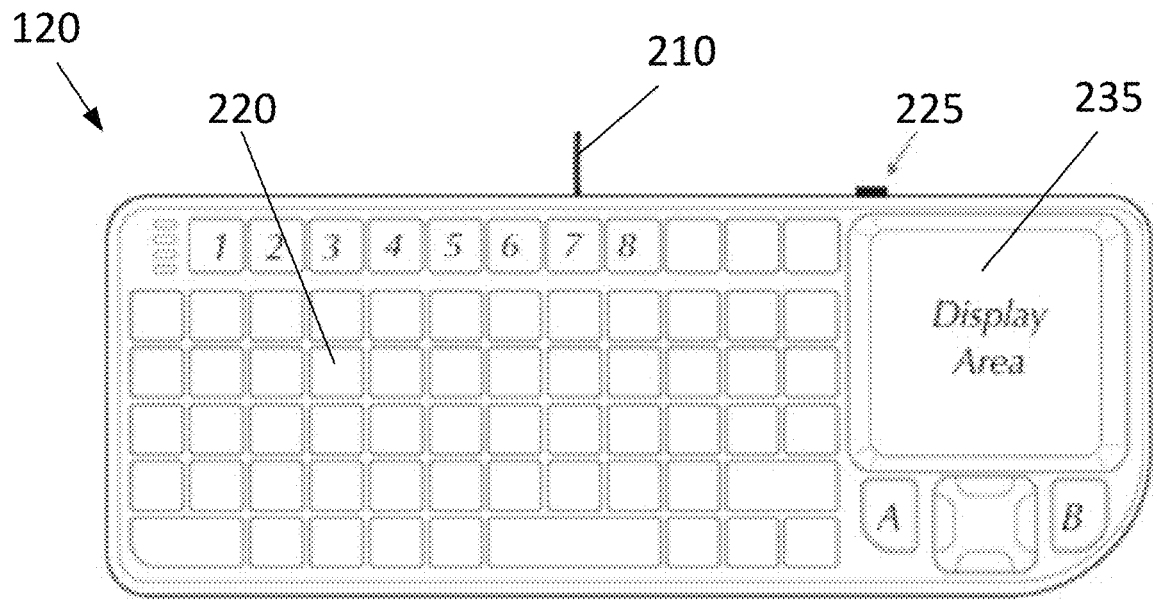
FIGS. 5-7 depict embodiments of an interface device.
Figure 6:
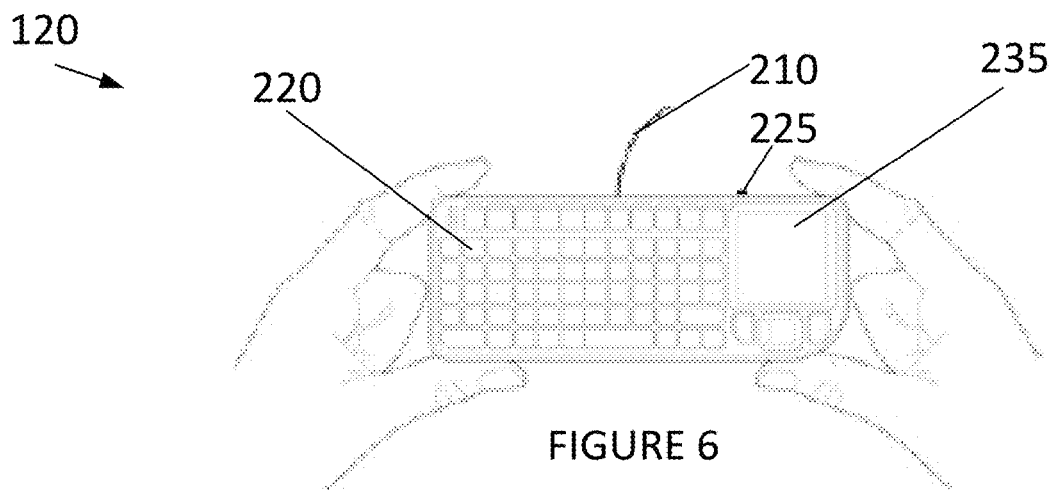
Figure 7:
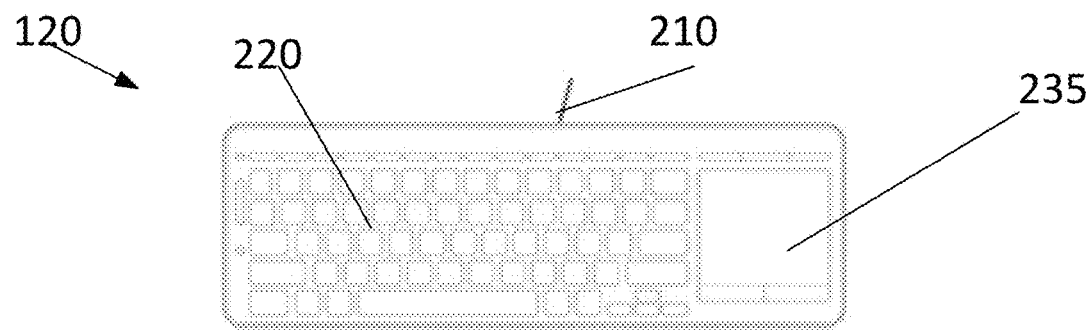

FIGS. 5-7 depict embodiments of an interface device 120. Elements depicted in FIGS. 5-7 may be described above. For the sake of brevity, a further description of these elements is omitted.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

What is claimed is:

1. A cryptology system comprising:
a first host device with a hardware processing device;
a first interface device that is a peripheral device that is configured to communicate with the first host device, the first interface device being configured to operate in a first mode and a second mode;
a hardware input device located on the first interface device configured to receive inputs from a user, and convert the inputs into plaintext, the input device configured to receive commands to change the first interface device between the first mode and the second mode, wherein in the first mode the first interface device is configured to transmit non-encrypted electronic data to the first host device, and in the second mode the first interface device is configured to transmit encrypted electronic data to the first host device;
a first cryptology device located on the first interface device configured to encrypt the plaintext into the encrypted electronic data before transmitting the encrypted electronic data to the first host device;
a memory device located on the first interface device, the memory device being configured to be automatically erased a first time responsive to initially communicatively coupling the first interface device with the first host device when the first interface device is in either the first mode and the second mode, the memory device being configured to be erased a second time when the first interface device transmits the encrypted electronic data to the first host device and the encrypted electronic data is encrypted before the first host device receives the encrypted electronic data, the memory device being configured to be erased a third time responsive to the input device located on the first interface device receiving the inputs from the user to change the first interface device between the first mode and the second mode.

2. The cryptology system of claim 1, wherein the first interface device is configured to receive second encrypted data from the first host device, and the first cryptology device is configured to decrypt the received second encrypted data at a location that is remote from the first host device.

3. The cryptology system of claim 2, wherein the decrypted data is configured to be presented on a display device local to the first interface device.

4. The cryptology system of claim 1, wherein the first interface device is an output only device and not configured to receive data from the first host device.

5. The cryptology system of claim 1, wherein in the second mode the first interface device is an output only device and not configured to receive data from the first host device.

6. A method associated with a cryptology system comprising:
communicating between a first interface device that is a peripheral device and a first host device;
receiving commands, via a hardware input device located on the first interface device, to change the first interface device between a first mode and a second mode, wherein in the first mode the first interface device is configured to transmit non-encrypted electronic data to the first host device, and in the second mode the first interface device is configured to transmit encrypted electronic data to the first host device;
receiving, via the input device located on the first interface device, inputs from a user;
converting the inputs into plaintext;
encrypting, via a first cryptology device located on the first interface device, the plaintext before transmitting the encrypted plaintext to the first host device
erasing a memory located on the first interface device a first time responsive to initially communicatively coupling the first interface device with the first host device when the first interface device is in either the first mode and the second mode;
erasing the memory a second time when the first interface device transmits the encrypted electronic data to the first host device and the encrypted electronic data is encrypted before the first host device receives the encrypted plaintext electronic data;
erasing the memory a third time responsive to the input device located on the first interface device receiving the inputs from the user to change the first interface device between the first mode and the second mode.

7. The method of claim 6, further comprising:
receiving, at the first interface device, second encrypted data from the first host device; and
decrypting the received encrypted data at a location that is remote from the first host device.

8. The method of claim 7, further comprising:
presented the decrypted data on a display device local to the first interface device.

9. The method of claim 6, wherein the first interface device is an output only device and not configured to receive commands from the first host device.

10. The method of claim 6, wherein in the second mode the first interface device is an output only device and not configured to receive commands from the first host device.

* * * * *